United States Patent [19]

Hill et al.

[11] Patent Number: 4,813,607
[45] Date of Patent: Mar. 21, 1989

[54] VARIABLE-AREA THRUST VECTORING AND REVERSING ASYMMETRIC AIRCRAFT EXHAUST NOZZLE

[75] Inventors: John E. Hill, Phoenix; Raymond D. Ruthven, Tempe, both of Ariz.

[73] Assignee: Allied-Signal Inc., Morris Township, Morris County, N.J.

[21] Appl. No.: 104,327

[22] Filed: Oct. 2, 1987

[51] Int. Cl.[4] .............................................. B64C 15/02
[52] U.S. Cl. ........................ 239/265.29; 239/265.41; 244/23 D; 244/110 B
[58] Field of Search ...................... 239/265.27, 265.29, 239/265.33, 265.35, 265.37, 265.39, 265.41; 244/12.5, 23 D, 110 B; 60/226.2, 230, 232

[56] References Cited

U.S. PATENT DOCUMENTS

| 2,625,008 | 1/1953 | Crook | 239/265.33 |
|---|---|---|---|
| 2,951,660 | 9/1960 | Giliberty | 239/265.33 |
| 3,258,916 | 7/1966 | Lehmann | . |
| 3,271,948 | 9/1966 | Fuller | . |
| 3,527,408 | 9/1970 | Markowski | 239/265.27 |
| 3,774,868 | 11/1973 | Goetz | 239/265.19 |
| 3,863,867 | 2/1975 | Souslin et al. | 60/226.2 |
| 3,979,067 | 9/1976 | Nash | 239/265.35 |
| 3,986,687 | 10/1976 | Beavers et al. | 239/265.41 |
| 4,000,610 | 1/1977 | Nash et al. | 239/265.27 |
| 4,000,612 | 1/1977 | Wakeman et al. | 239/265.35 |
| 4,037,405 | 7/1977 | Huenniger et al. | 239/265.27 |
| 4,098,076 | 7/1978 | Young et al. | 60/230 |
| 4,175,385 | 11/1979 | Nash | 239/265.27 |
| 4,280,660 | 7/1981 | Wooten, Jr. et al. | 239/265.35 |
| 4,575,006 | 3/1986 | Madden | 244/110 B |
| 4,587,806 | 5/1986 | Madden | 244/12.5 |
| 4,660,767 | 4/1987 | Scrace | 239/265.35 |
| 4,690,329 | 9/1987 | Madden | 60/230 |
| 4,714,197 | 12/1987 | Thayer | 244/23 D |

Primary Examiner—Andres Kashnikow
Assistant Examiner—Michael J. Forman
Attorney, Agent, or Firm—Terry L. Miller; James W. McFarland

[57] ABSTRACT

A variable-area, thrust vectoring, and thrust reversing aircraft propulsion nozzle includes mechanization which is uniquely simple, strong, and lightweight, as well as being able to endure the harsh, high-temperature environment of a jet engine exhaust flow. The nozzle employs a minimal number of actuators, and structure which is isolated from reversing thrust forces so that an overall objective of strength, simplicity, and lightweight is achieved by the invention.

23 Claims, 3 Drawing Sheets

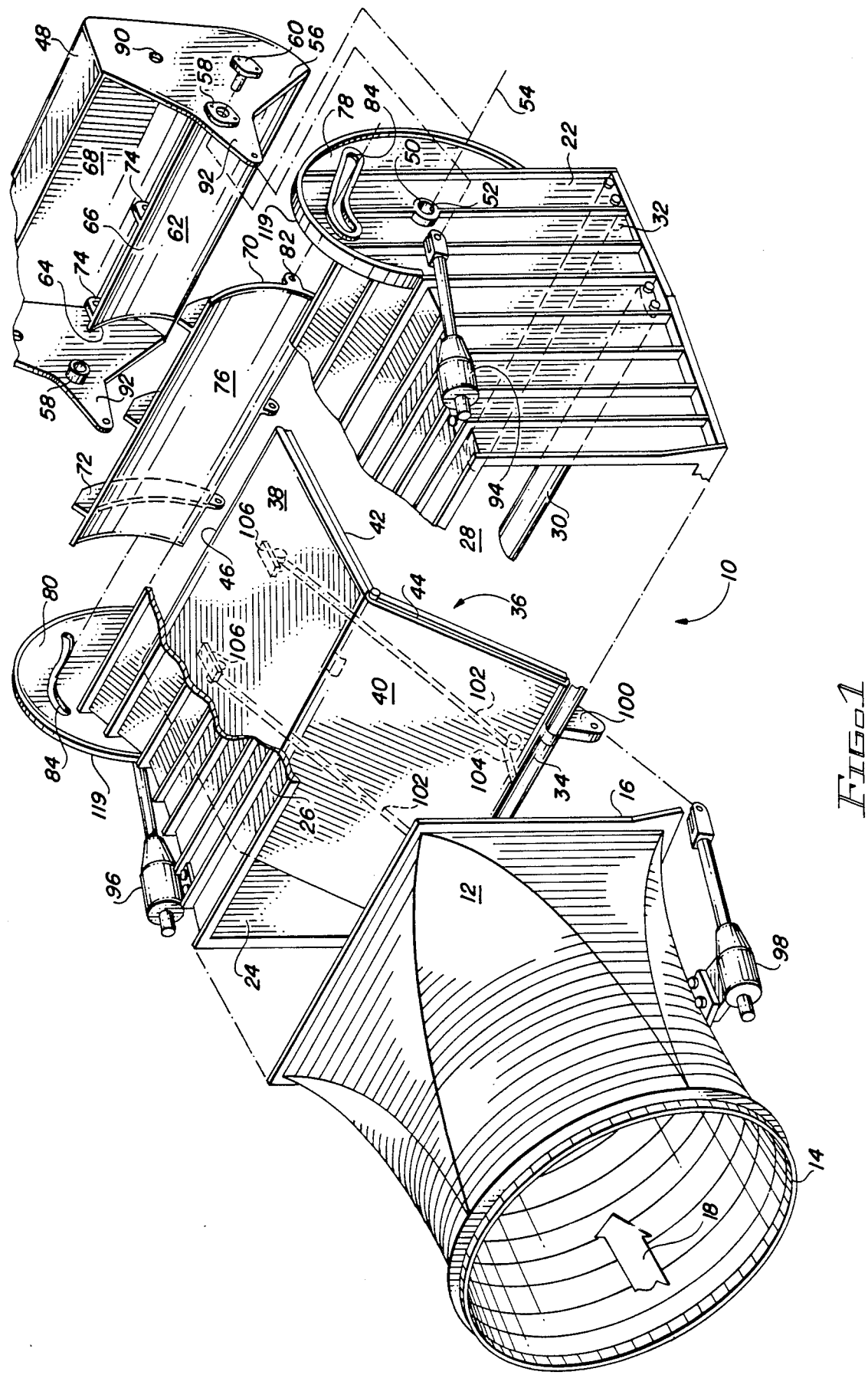

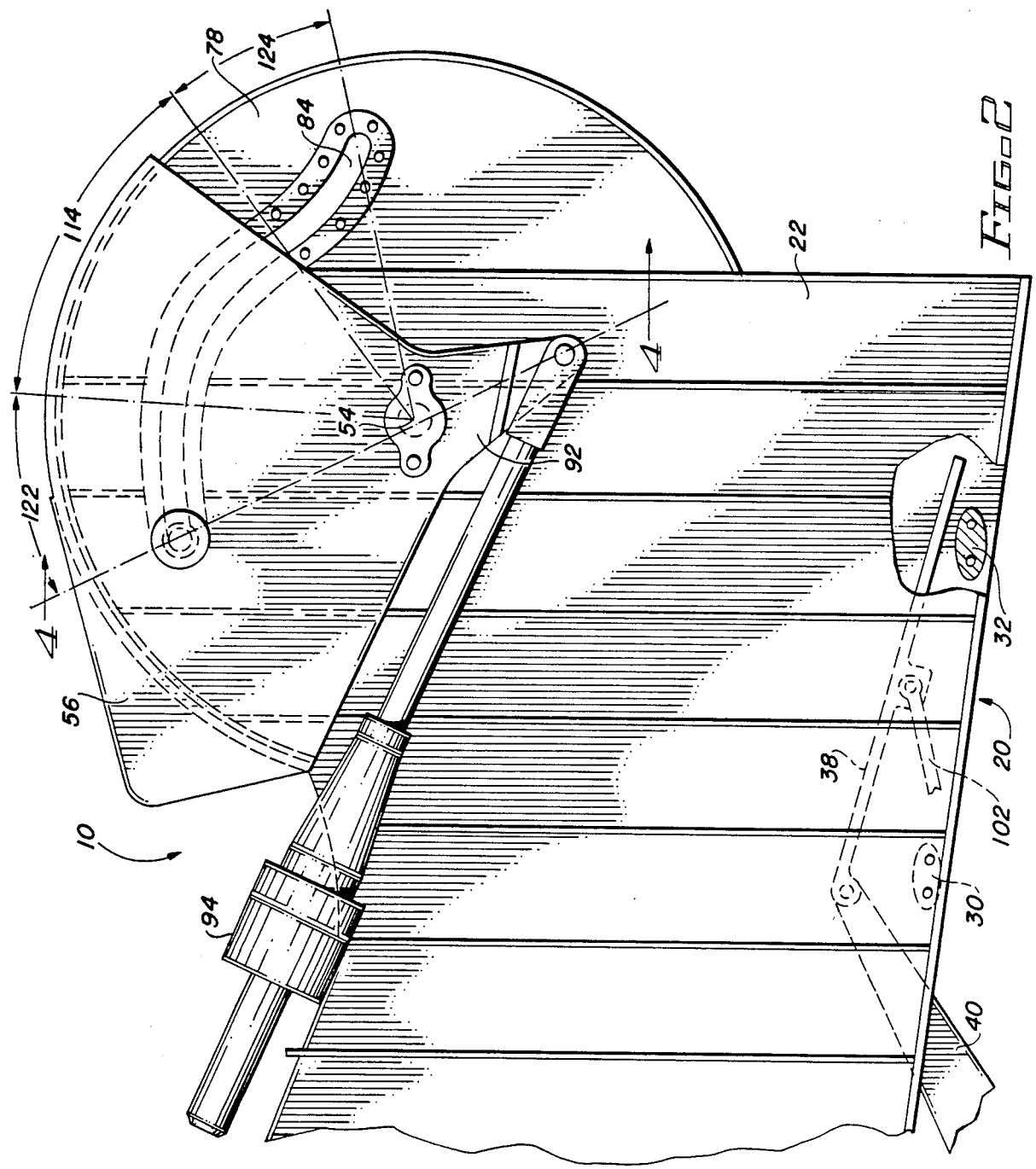
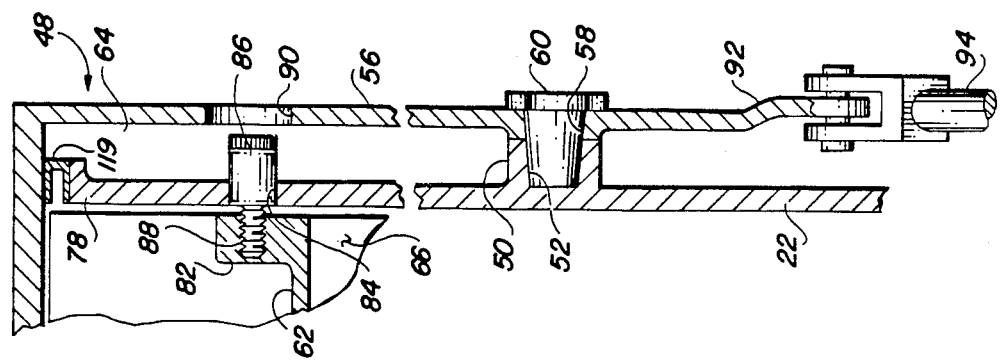

VARIABLE-AREA THRUST VECTORING AND REVERSING ASYMMETRIC AIRCRAFT EXHAUST NOZZLE

TECHNICAL FIELD

The field of the present invention is thrust vectoring and thrust reversing aircraft engine exhaust nozzles. More particularly, the present invention relates to a variable-area exhaust nozzle having the capability of both thrust vectoring and thrust reversing in addition to area variation to accommodate varying engine throttle settings and flight altitudes.

BACKGROUND ART

A conventional thrust vectoring and thrust reversing variable-area exhaust nozzle is known in accord with the teaching of U.S. Pat. No. 4,175,385, of D. O. Nash, and assigned to the General Electric Company. This nozzle achieves variable-area by a combination of plural flap members moving in coordination between spaced apart vertical side walls. At least four flap members are used, and their movement between the spaced apart vertical side walls requires coordination of several actuators. Similarly, this nozzle provides thrust vectoring and thrust reversing by the movement of a cowl member about first and second spaced apart axes transverse to the axis of the exhaust nozzle. The cowl member carries a separate movable lip member which is pivotal relative thereto as the cowl member pivots about the first and second axes relative to the remainder of the exhaust nozzle. A brief perusal of the '385 patent will quickly reveal that a large number of actuators is required to utilize this nozzle. Additionally these actuators must be operated in a coordinated fashion in order to achieve the objectives of the invention. In addition, this nozzle employs a separate arcuate deflector member which is movable arcuately from a position outside of the fluid flow stream to a position within the stream for achieving thrust vectoring of the type required for short or vertical take off and landing of an aircraft (i.e., STOL or VTOL). This deflector requires still more actuators for its operation.

Overall, the teaching of the '385 patent must be considered as complex and as requiring a multitude of component parts. Further, the nozzle requires coordination of multiple actuators to achieve its goals. Finally, the '385 teaching does not address the problem of achieving motive gas sealing between the multitude of relatively moving parts of the nozzle. Without adequate sealing between the parts of a variable exhaust nozzle, leakage of motive gas will compromise the performance of the nozzle, and of the aircraft upon which the nozzle is installed.

A more recent thrust vectoring exhaust nozzle for aircraft is known in accord with the teaching of U.S. Pat. No. 4,660,767, of H. A. Scarce, and assigned to Rolls-Royce. This later effort is notable for its simplicity in comparison with the earlier '385 patent. Particularly the '767 patent utilizes a relatively simple cowl member which is pivotally movable between a first position removed from the fluid flow stream and a second position in which the cowl member deflects the fluid stream. A flap is coordinated with the movement of the cowl member by simple linkage such that the flap member moves from a position bounding the lower floor of the fluid flow path to a position providing guidance to the deflected flow stream as the latter is directed downwardly and perhaps also slightly forwardly by the cowl member. This nozzle is intended primarily for use on a vertical take off and landing (VTOL) aircraft, and as such is not intended to accomplish variable-area or thrust reversing as is required for high performance jet aircraft to enhance flight maneuverability and shorten landing roll.

It will be seen from the above that while the nozzle apparatus according to the '767 patent provides a reduced parts count and simplicity of operation and structure in comparison with the '385 patent, the former nozzle does not provide either variable-area or thrust reversing capability as does the latter teaching. Therefore, it is apparent that a need exists in the pertinent art for an exhaust nozzle which will provide all three functions of variable-area, thrust vectoring, and thrust reversing, while also providing relatively simple structure and ease of operation with a minimal number of actuators. The structure of such an exhaust nozzle should also be relatively light so that the increased performance offered by such a nozzle is not substantially canceled by the weight penalty of the nozzle itself. Further, such an exhaust nozzle should not significantly increase the envelope of the vehicle upon which it is installed. That is, the exhaust nozzle in its basic structure and actuators required for its operation should not present drag-producing structures which extend into the airstream around the vehicle or require undesirably bulky nacelles or other aerodynamic fairings to shield such parts of the nozzle.

DISCLOSURE OF THE INVENTION

In view of the above it is an object for the present invention to provide a variable-area, thrust vectoring, and thrust reversing exhaust nozzle which is comparatively simple in its structure, and which requires a minimal number of actuators to achieve the functions of the nozzle.

An additional object of this invention is to provide such an exhaust nozzle having an inherently strong and rugged structure well able to endure extended operation in the high-temperature environment of a jet engine exhaust flow.

An additional object for this invention is to provide such an exhaust nozzle wherein component parts of the nozzle by their cooperative interaction in performing multiple functions, or by their assisting in the sustaining of operating stresses of the nozzle result in both a comparatively low parts count and a lightweight structure.

Accordingly, the present invention provides an exhaust nozzle wherein a pair of spaced apart walls and a connecting third wall cooperate to define a downwardly opening axially extending channel for motive exhaust fluid flow. A pair of flap-like members are pivotally connected and are movable relative the third wall between the pair of walls to bound the open lower side of the channel-like flow path. These flaps are movable under control of at least one actuator to provide a variable discharge area of rectangular cross-section for the exhaust nozzle. A cowl member is pivotally carried by the pair of walls and is movable transversely to the flow path along a vertical movement path so as to deflect the latter downwardly for thrust vectoring. The cowl member carries a pivotal sub-cow member which during thrust vectoring maintains sealing engagement with the third wall to maintain good thrust efficiency. Further movement of the cowl member into the motive fluid flow stream causes the sub-cowl to break sealing engagement with the third wall and movement of the sub-cowl to a thrust reversing position wherein the cowl member and sub-cowl cooperatively define a transverse cusp or horizontal virtual splitter immersed in and dividing the motive fluid flow into two vertically separated portions. The cowl member directs the lower motive fluid flow portion downwardly and forwardly while the sub-cowl directs the upper fluid flow portion upwardly and forwardly. As a result, thrust reversing substantially without thrust vectoring is achieved. During thrust reversing, which imposes considerable operating thrust forces upon the sub-cowl, the latter achieves a position of repose supported entirely upon the cowl member. A significant structural advantage from this feature results in comparatively lightweight structure.

Additional objects and advantages of the present invention will appear from a reading of the following detailed description of a single preferred embodiment of the invention taken in conjunction with the following drawing figures in which:

BRIEF DESCRIPTION OF THE DRAWINGS

FIG. 1 presents an exploded perspective view of an exhaust nozzle according to the invention, and having parts thereof broken away for clarity of illustration;

FIG. 2 provides a fragmentary side elevation view of the inventive exhaust nozzle;

FIG. 4 is a fragmentary cross-sectional view taken along line 4—4 of FIG. 2 and looking in the direction of the arrows.

BEST MODE FOR CARRYING OUT THE INVENTION

Figure 3:
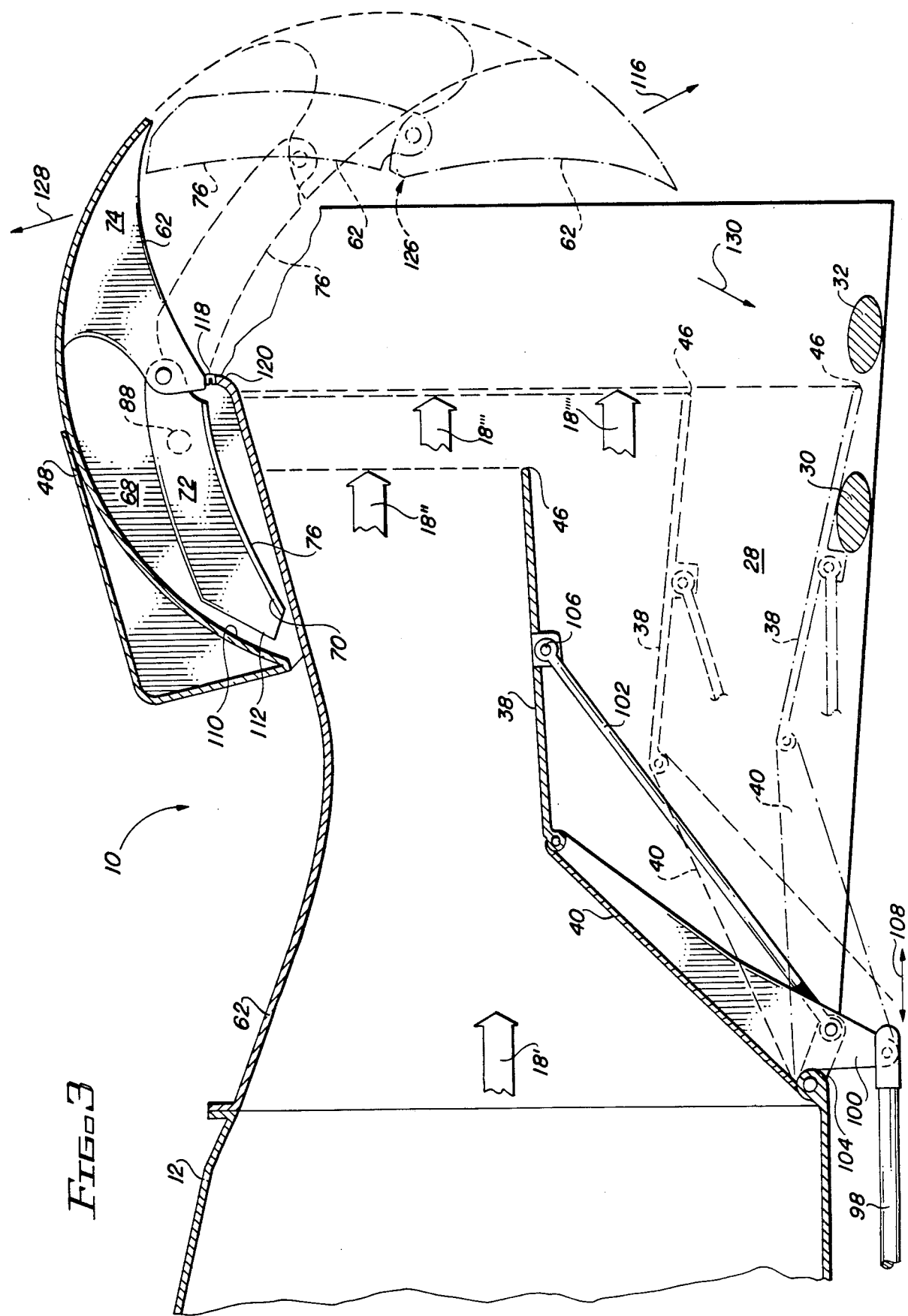
FIG. 3 illustrates a fragmentary cross-sectional side elevation view of the exhaust nozzle according to the invention and depicts parts thereof in alternative operative positions.

Referring to FIG. 1, a variable-area, thrust vectoring, and thrust reversing exhaust nozzle 10 is depicted in exploded perspective view to afford the reader an overall understanding of the structure. The nozzle 10 includes an elongate axially extending transition duct portion 12 defining an open circular inlet end 14 and an open rectangular discharge end 16. The transition duct 12 receives a flow of motive exhaust fluid from a jet engine (not shown), which is depicted by arrow 18.

Downstream of the transition duct 12, and connected thereto at the open discharge end 16 thereof, is an axially elongate downwardly opening generally channel-defining member 20. The member 20 includes a pair of axially extending spaced apart vertical side walls 22,24 and an axially extending transverse upper third wall 26 extending between and connecting the walls 22 and 24. The channel member 20 is open both rearwardly and downwardly to define a cavity 28 therewithin. In order to maintain the side walls in selected spaced apart relation, a pair of transverse cross bars 30,32 extend between and connect with the walls 22,24 adjacent the lower marginal edge thereof. Also extending between the walls 22 and 24, and immediately downstream of the discharge end 16 of transition duct 12, is a transverse hinge portion 34

Pivotally attaching to the hinge portion 34 and carried thereby is a flap assembly generally referenced with the numeral 36. The flap assembly 36 is movably received in the cavity 28 between the side walls 22,24, and includes a flap member 38 and a flap carrier member 40. Both the flap member 38 and flap carrier member 40 extend transversely between the walls 22,24, and sealingly engage these walls via edge seal members 42 and 44 carried thereby. The flap carrier member 40 at the upstream edge thereof is hingedly attached to the transverse hinge portion 34, and at a downstream transverse edge portion pivotally carries the flap member 38. Similarly, the flap member 38 extends downstream from its pivotal connection with the flap carrier member 40 to terminate in a downstream marginal edge 46.

Also pivotally carried by the channel-defining member 20 is a transversely extending cowl member 48. In order to carry the cowl member 48, the member 20 defines a pair of transversely aligned bearing bosses 50 (only one of which is visible viewing FIG. 1). The bearing bosses 50 each define a bearing bore 52 so that a transverse pivot axis 54 is defined for the cowl member 48. The cowl member 48 includes a pair of spaced apart flange parts 56 which each define one of a pair of transversely aligned pivot bores 58. The flange parts 56 straddle the channel member 20 to align bores 52 and 58 so that a pair of pivot pin members 60 (only one of which is depicted in FIG. 1)are received therein to pivotally connect the cowl member 48 to channel member 20 (viewing also FIG. 4).

Within the cowl member 48, the latter includes a transversely extending wall part 62 extending between but at each end thereof spaced from the flange parts 56 to define a pair of grooves 64 (only one of which is visible). The wall part 62 defines an inwardly disposed arcuate surface 66 the function of which is more fully explained below. The reader may be assisted by referring at this time also to FIG. 3 in conjunction with FIG. 1 and FIG. 4. The wall part 62 cooperates with the remainder of cowl member 48 to define a recess 68. Pivotally carried within the recess 68 is an arcuate transversely extending sub-cowl member 70. The sub-cowl member 70 includes plural axially extending support ribs 72 which pivotally attach to like reinforcing ribs 74 of cowl member 48. Also, the sub-cowl member 70 defines a transversely extending arcuate surface 76 like the surface 66 and confronting the flow path of channel member 20.

In order to guide the sub-cowl member 70, the channel member 20 defines a pair of spaced apart external semi-circular ear portions 78,80, which are each respectively in the plane of one side wall 22,24. Viewing FIGS. 1, 2 and 4 in conjunction, it is seen that the ear portions 78,80 are each received in an end groove 64 of the cowl member 48. The sub-cowl member 70 is received between the ear portions 78,80, and defines a pair of transversely spaced apart tabs 82. Each ear portion 78,80 defines an identical cam slot 84, and a roller-type cam follower 86 is received in each cam slot 84 and is carried upon a pin member 88 engaging a respective tab 82 of the sub-cowl member. Viewing FIGS. 1 and 4, it is seen that apertures 90 of each flange part 56 allows access to the cam followers 86 and pins 88.

Further to the above, each of the flange parts 56 defines a respective downwardly extending lever part 92. A pair of linear actuators 94,96 are mounted to the channel member 20 and connect to the respective lever parts 92 of the flange parts 56. Similarly, a second pair of linear actuators 98 (only one of which is visible in FIG. 1) are mounted to transition duct 12. These latter actuators connect to respective lever portions 100 of the flap carrier member 40. These latter actuators also act in conjunction with a pair of elongate drag links 102 extending between and pivotally connecting with a pair of outwardly and rearwardly extending arm parts 104 of the hinge portion 34, and with brackets 106 securing to the flap member 38 to coordinate motion of the latter flap member.

Having observed the structure of exhaust nozzle 10, attention may now be directed to its operation, and to the functional and structural cooperation of the parts thereof. As mentioned previously, during operation the exhaust nozzle 10 receives a flow of high-temperature pressurized jet engine exhaust gasses 18 at the inlet end of transition duct 12. Those skilled in the pertinent art will recognize that transition duct 12 is designed to convert the motive fluid flow 18 from a flow field of circular cross-section at inlet end 14 to a rectangular flow field at discharge end 16 while minimizing flow energy losses. The resulting rectangular cross-section motive fluid flow is delivered into channel member 20, as is depicted by arrow 18' on FIGS. 1 and 3.

Viewing now FIG. 3, it will be seen that the fluid flow 18' in channel member 20 may be selectively subjected to varying degrees of convergence or to convergent-divergent flow dependent upon the relative positions of flap carrier member 40 and flap member 38. In the solid line position of the members 38,40, the nozzle 10 defines essentially a convergent nozzle of discharge area defined at the plane touched by flow arrow 18". This configuration of the exhaust nozzle 10 is appropriate for intermediate power settings such as would be used for economical cruising of an aircraft. Also, this exhaust nozzle configuration may be used for thrust vectoring, and is used for thrust reversing as will be seen below.

Alternatively, the dashed line position of members 38,40 causes nozzle 10 to define a convergent-divergent motive fluid flow path having a discharge area defined at the plane touched by arrow 18'''. This configuration of the exhaust nozzle 10 is appropriate for full non-augmented power of the type used for take off, dash speed, and aerial combat flight.

Again alternatively, the dash-dot line position of members 38,40 causes nozzle 10 to define a convergent divergent motive fluid flow path having a discharge area defined at the plane touched by arrow 18''''. This configuration of the exhaust nozzle 10 is appropriate for full augmented (after burning) power of the type used for take off, emergency and aerial combat flight. In each case above, it is recognized that the rectangular discharge area of the exhaust nozzle 10 is directly proportionate to the distance of marginal edge 46 of flap 38 from the upper third wall 26 of channel member 20.

It will be appreciated that the members 38 and 40 are caused to move between the solid line, dashed line, and dash-dot line positions (and intermediate positions) by simple linear reciprocation motion of the actuator 98, as depicted by arrow 108. The coordinate movement of flap member 38 in response to movement of flap carrier member 40 is achieved entirely by the four-link geometric relationship of these two members with the drag link 102 connecting with arm parts 104 and brackets 106. Therefore, multiple coordinated actuators are not required to achieve the variable-area function of the present invention. Further, it is easily appreciated that the structure and mechanization used to achieve the variable-area function of the present exhaust nozzle is both strong and rugged while being light in weight so that an objective of the invention is fully realized. Additionally, while the present preferred embodiment of the invention has been described and depicted with two actuators 98 (referring to FIGS. 1 and 3) for varying the discharge area of the nozzle 10, a single centrally located actuator may be sufficient for some nozzle sizes and applications. In these applications with a single actuator 98, an additional increment of simplicity is achieved for the nozzle 10.

Now let us consider thrust vectoring and thrust reversing operation of the exhaust nozzle 10. The reader should refer primarily to FIGS. 2 and 3, with secondary reference to FIGS. 1 and 4 for an understanding of structural relations of the component parts of the nozzle. Viewing FIG. 3, the cowl member 48 and sub-cowl member 70 are shown in solid lines in a first operative position wherein the cowl members are stowed and the nozzle is configured for forward flight without thrust reversing or vectoring. In this stowed position of the cowl members, it will be seen that the sub-cowl member 70 is received substantially into the recess 68 of cowl member 48 so that a back wall 110 of the latter is approached and confronted by an abutment surface 112 defined on each support rib 72 thereof.

In order to achieve thrust vectoring, the actuators 94,96 are used to pivot cowl member 48 to the dashed line position of FIG. 3. The sub-cowl member 70 is carried along with the cowl member 48 by its pivotal connection at its support ribs 72 with the reinforcing ribs 74 of the cowl member. However, the pivotal relative position of sub-cowl 70 to cowl 48 is controlled by the cam followers 86 moving in cam slots 84 as the sub-cowl is carried toward its dashed line position of FIG. 3.

Viewing FIG. 2, it will be seen that the cam slots 84 define a central arcuate section 114 of constant true radius with respect to the pivot axis 54 for cowl member 48. In the dashed line position of sub-cowl 70 as seen in FIG. 3, the cam followers 86 are disposed on the true radius section 114 of cam slots 84 at the most clockwise margin thereof, and the sub-cowl 48 is disposed pivotally out of recess 68 so that its arcuate surface 76 defines an extension of the arcuate surface 66 of the cowl member 48. In this position, the surfaces 66 and 76 cooperate to deflect the motive exhaust flow downwardly as it flows rearwardly to result in thrust vectoring, as depicted by arrow 116. It will be noted that the sub-cowl member 70 is in sealing engagement with a transverse seal member 118 carried by the transverse third wall 26 adjacent the downstream terminal edge 120 thereof. Because the arc portion 114 of cam slot 84 is substantially equal in length to the arcuate surface 76 of sub-cowl member 70, this surface 76 remains in contact with the seal member 118 during most of the movement of the cowl members between the stowed solid line position of FIG. 3, and the dash line thrust vectoring position as depicted. Also in order to prevent motive fluid leakage and to preserve the efficiency of the nozzle 10, the ear portions 78 and 80 each carry respective arcuate seal members 119 on the radially outer perimeter thereof, viewing FIGS. 1 and 4. The seals 119 cooperate with the cowl member 48 within the grooves 64 to prevent fluid leakage laterally between ears 78,80 and the cowl member 48.

The cam slots 84 also include an end section 122 which deviates radially outwardly of a true radius with respect to pivot axis 54 (viewing FIG. 2). This cam slot section results in the sub-cowl member pivoting between its stowed position in recess 68 and its thrust vectoring relative position (dashed line position of FIG. 3) as the cowl members move between their stowed and thrust vectoring positions.

Finally, the cam slots 84 also include an end section 124 which deviates rapidly outwardly with respect to the true radius section 114. In order to configure the exhaust nozzle 10 for thrust reversing operation, the actuators 94,96 are employed to pivot the cowl member 48 beyond the thrust vectoring position shown in dashed lines on FIG. 3, and to the thrust reversing position shown by dash-dot lines of this FIGURE. As the cowl member 48 moves to its thrust reversing position, the cam followers 86 move onto the portion 124 of cam slot 84. As a result, the surface 76 of the sub-cowl breaks contact with the sealing member 118, and the sub-cowl is quickly moved back into recess 68 of the cowl member 48. In order to avoid imposing reversing thrusts upon the cam followers 86 and cam slot 84, the latter is configured in its section 124 so that the abutment surfaces 112 of ribs 72 engage the back wall 110 of cowl member 48. As a result, all thrust reversing forces are carried through the cowl member 48, and to pivot pins 60. As a consequence, a significant structural advantage results for exhaust nozzle 10. Many of the component parts thereof may be made lighter than would be possible were these parts required to participate alone in sustaining reversing thrust. For example, the sub-cowl member may be relatively light in weight because it is so well supported by the cowl member in the reversing position. Similarly, the cowl member is inherently strong because of the shape of its transverse portion, and of the flange portions which sustain thrust reversing forces in pure tension. All these factors contribute to achieving objects of the invention.

Viewing FIG. 3, it will be seen that in the dash-dot line thrust reversing position, the arcuate surfaces 66 and 76 of cowls 48 and 70 are angularly disposed to define a horizontally disposed cusp or virtual splitter 126. With the flap 38 and flap carrier 48 disposed in the intermediate power (solid line) position, the motive gas flow 18″ is substantially centered upon the splitter 126. Thus, the exhaust flow is divided vertically into two substantially equal portions. The arcuate surface 76 directs the upper flow portion upwardly and forwardly as depicted by arrow 128 while the surface 66 directs the lower flow portion downwardly and forwardly as depicted by arrow 130. Thrust reversing without vectoring is achieved by this division of the motive fluid flow of the exhaust nozzle 10. It will be noted that because the channel member 20 is open downwardly, the reversing fluid flow 130 is not interfered with by any structure save the cross bars 30,32.

While the present invention has been depicted, described and defined by reference to a single preferred embodiment of the invention, no limitation upon the invention is implied by such reference, and no such limitation is to be inferred therefrom. The invention is intended to be limited only by the spirit and scope of the appended claims, which also provide additional definition of the invention.

What is claimed is:

1. Variable-area aircraft propulsion exhaust nozzle apparatus comprising:
    an axially elongate channel member including a pair of axially extending generally parallel spaced apart vertical side walls, and a transverse axially extending third wall connecting said pair of walls, said walls cooperating to bound therebetween an axially extending flow path for communicating a flow of motive turbine engine exhaust gasses rearwardly to ambient;
    first and second axially extending and axially adjacent flap members hingedly interconnected at adjacent edge portions of each, and said flap members extending transversely between said pair of side walls to movably and sealingly engage therewith, said flap members also cooperatively bounding said fluid flow path oppositely said third wall: the first of said flap members pivotally connecting at an upstream edge portion thereof with said channel member adjacent an upstream end thereof and spaced from said third wall, a downstream terminal edge of said second flap member cooperating with said walls to define a motive fluid discharge opening for said nozzle apparatus which in transverse section is of rectangular shape and varying in area in response to movement of said flap members relative to said walls;
    an arm member extending outwardly and in a downstream direction from immediately adjacent said pivotal connection of said first flap member with said channel member and fixedly positioned relative to the latter;
    a link member pivotally connecting both with said arm member adjacent a distal end thereof and with said second flap member to coordinately move the latter in response to pivotal movement of said first flap member relative to said channel member; and
    means for selectively pivotally moving said first flap member relative to said channel member to result in coordinate relative movement of said second flap member by cooperation of said first flap member and said link member, whereby said discharge opening is of selectively varying area dependent upon movement of said flap members.

2. The invention of claim 1 wherein each of said first and said second flap members carries respective sealing members for moving and sealing engagement with said pair of side walls.

3. The invention of claim 1 wherein said first and said second flap members cooperate with said arm member and said link member to define a pivotally connected four-bar linkage which determines the axial and angular position of said second flap member in dependence upon pivotal movement of said first flap member.

4. The invention of claim 1 wherein said exhaust nozzle apparatus further includes a transversely extending cowl member including a transversely extending wall part defining a transverse first arcuate surface confronting said flow path and a transversely extending recess adjacent said wall part and spaced from said fluid flow path with respect to said wall part, means for pivotally connecting said cowl member with said channel member for movement about a transverse pivot axis between a stowed position wherein said transverse wall part is removed from said fluid flow and successive thrust vectoring and thrust reversing positions both wherein said wall part arcuate surface is immersed in said fluid flow issuing from said channel member to deflect at least a portion of said flow laterally relative to the axis of said exhaust nozzle, said cowl member at said recess also carrying a transversely extending sub-cowl member defining a transverse second arcuate surface like said cowl member first arcuate surface, said sub-cowl member being pivotally received within said recess to define a transverse pivot axis intermediate said arcuate surfaces and being movable between a first position wherein said sub-cowl member is pivoted into said recess and a second position wherein said sub-cowl member is pivoted outwardly of said recess so that said second arcuate surface defines an arcuate extension of said first arcuate surface:

means for moving said sub-cowl member between said first position, said second position, and said first position in response to movement of said cowl member between said stowed position, said thrust vectoring position, and said thrust reversing position, respectively.

5. The invention of claim 4 wherein said exhaust nozzle apparatus includes means for maintaining sealing cooperation of said sub-cowl member with said third wall substantially throughout movement of said cowl member between said stowed position and said thrust vectoring position.

6. The invention of claim 5 wherein said moving means comprises said nozzle apparatus defining a cam track; and a cam follower carried by said sub-cowl member and moving along said cam track in response to movement of said cowl member between said stowed, said thrust vectoring, and said thrust reversing positions; said cam track including a central arcuate section of constant true radius with respect to said pivot axis of said cowl member, said sub-cowl member being in said second position thereof while said cam follower resides upon said central true radius section of said cam track, and opposite end sections of said cam track which each deviate radially outwardly with respect to said central true radius section.

7. The invention of claim 6 wherein said means for maintaining sealing cooperation of said sub-cowl member with said third wall comprises a transverse sealing member carried by said third wall and engageable by said sub-cowl member arcuate surface while said sub-cowl occupies said second position thereof, and said cam track central true radius section being of sufficient arcuate length to maintain said sub-cowl in said second position thereof substantially entirely throughout movement of said cowl member between said stowed and said thrust vectoring positions.

8. The invention of claim 4 wherein said sub-cowl member and said cowl member define cooperating abutment means for supporting said sub-cowl member in said first position thereof entirely by said cowl member in said reversing position of the latter thereby to relieve said moving means of all thrust reversing forces from said sub-cowl member.

9. The invention of claim 8 wherein said first arcuate surface and said second arcuate surface cooperate in said thrust reversing position of said cowl member and sub-cowl member to define therebetween a transverse surface cusp or virtual splitter which is immersed in said motive fluid flow.

10. The invention of claim 9 wherein said transverse surface cusp divides said motive fluid flow substantially equally into a first portion and a second portion, said first arcuate surface directing said first fluid flow portion transversely in a first direction and forwardly, while said second arcuate surface directs said second fluid flow portion transversely in a second direction opposite said first direction and forwardly, whereby thrust reversing without vectoring is achieved.

11. Thrust reversing and thrust vectoring aircraft propulsion exhaust nozzle apparatus comprising:

an elongate axially extending channel member including a pair of generally parallel axially extending vertical side walls, and a transverse axially extending third wall connecting said pair of walls, said walls cooperating to bound an axially extending flow path for communicating a flow of motive turbine engine exhaust gasses to ambient;

means cooperating with said walls for bounding said flow path so as to define an outlet therefore of generally rectangular shape in transverse section;

a cowl member pivotally attaching to said exhaust nozzle for movement about a transverse axis between a stowed position wherein an arcuate deflector surface of said cowl member is removed from said fluid flow and a thrust vectoring position wherein said arcuate deflector surface is immersed in said fluid flow as the latter issues from said outlet to deflect the flow transversely in a first direction, said cowl member including a sub-cowl member in part defining said arcuate deflector surface and sealingly cooperating with said third wall substantially throughout movement of said cowl member between said stowed position and said thrust vectoring position;

said cowl member being movable farther into said fluid flow to a thrust reversing position wherein said sub-cowl member breaks sealing contact with said third wall to open an aperture therebetween for flow of motive fluid in a transverse second direction opposite said first direction, said sub-cowl member and said cowl member cooperating in said thrust reversing position to define a transverse surface cusp or virtual splitter dividing said motive fluid flow substantially equally into first and second portions, said cowl member directing said first portion transversely in said first direction and forwardly, while said sub-cowl member directs said second portion transversely in said second direction and forwardly, whereby thrust reversing is achieved substantially without thrust vectoring.

12. The invention of claim 11 wherein said cowl member defines a transversely extending wall portion in part defining said arcuate deflector surface, and a recess extending transversely adjacent to said wall portion and disposed away from said flow path relative thereto; said sub-cowl member being disposed in said recess and pivotally relating with said cowl member in a first position pivoted inwardly of said recess and angulated with respect to said cowl member wall portion cooperatively defining therewith said surface cusp, said sub-cowl member in a second position thereof pivoted outwardly of said recess defining a surface extension of said arcuate surface of said cowl member wall portion.

13. The invention of claim 12 wherein said exhaust nozzle apparatus further includes means for moving said sub-cowl member between said first position, said second position, and said first position in response to movement of said cowl member between said stowed position, said thrust reversing position, and said thrust vectoring position, respectively.

14. The invention of claim 13 wherein said means for moving said sub-cowl member includes said nozzle apparatus including a cam track disposed relative to said transverse pivot axis of said cowl member, said sub-cowl member pivotally attaching to said cowl member proximate said transverse surface cusp, and said sub-cowl carrying a cam follower member received in said cam track and moving therealong in response to pivotal movement of said cowl member.

15. The invention of claim 14 wherein said cam track includes a central true radius section with respect to said transverse pivot axis of said cowl member, said central true radius section cooperating with said cam follower to maintain said sub-cowl in said second position thereof substantially throughout movement of said cowl member between said stowed and said thrust vectoring position thereby to maintain sealing engagement of a sub-cowl member wall part arcuate deflection surface with a transversely extending seal member carried by said third wall: said cam track also including opposite end sections deviating radially outwardly of said true radius central section and each allowing movement of said sub-cowl member to said first position thereof.

16. The invention of claim 15 wherein said cowl member and said sub-cowl member define cooperating means for supporting the latter exclusively upon the former in said thrust reversing position thereof thereby to isolate said cam track and said cam follower from thrust reversing forces.

17. The invention of claim 16 wherein said cooperating supporting means includes said cowl member defining a back wall surface and said sub-cowl member defining an abutment surface spaced from said pivotal engagement of said cowl member and said sub-cowl member and engaging said back wall surface upon movement of said sub-cowl member to said first position thereof with said cowl member in said thrust reversing position.

18. The invention of claim 15 wherein said exhaust nozzle apparatus further includes a pair of spaced apart semi-circular ear portions each in general alignment with a respective one of said pair of side walls, each one of said ear portions defining a respective said cam track, said cowl member defining a respective pair of spaced apart arcuate grooves movably receiving said pair of ear portions, and each of said pair of ear portions carrying a respective arcuate sealing member cooperating with said cowl member in all positions thereof to prevent flow of motive gasses therebetween.

19. Variable-area, thrust vectoring and thrust reversing aircraft propulsion exhaust nozzle apparatus comprising:
an axially elongate transition duct member defining an open inlet end of generally circular shape in transverse section for receiving a flow of turbine engine motive exhaust gasses, and an open outlet end of generally rectangular shape in transverse section for discharging said motive fluid flow to a remainder of said exhaust nozzle apparatus, said transition duct member blending smoothly from said inlet end to said outlet end thereby to minimize motive fluid flow energy losses therein;
an axially elongate downwardly open channel member at an upstream end thereof connecting with said outlet end of said transition duct to receive said motive fluid flow, said channel member including a pair of axially extending transversely spaced apart and generally parallel vertical side walls, and a transverse axially extending upper wall connecting said pair of side walls, at a downstream end thereof said channel member defining a pair of spaced apart upwardly and rearwardly extending semicircular ear potions each in general alignment with a respective one of said pair of side walls;
a transversely and axially extending flap carrier member pivotally connecting adjacent an upstream edge thereof with the remainder of said nozzle apparatus immediately downstream of said transition duct outlet and proximate to the upstream end of said channel member, said flap carrier member sealingly and movably cooperating with said pair of side walls of said channel member to downwardly bound a motive fluid flow path therethrough;
a transversely and axially extending flap member pivotally connecting adjacent an upstream edge thereof with said flap carrier member adjacent a downstream edge of the latter, said flap member sealingly and movably cooperating with said pair of side walls to downwardly bound said motive fluid flow path immediately downstream of said flap carrier member, said flap member defining a downstream transverse marginal edge cooperating with said pair of side walls and with said upper wall to define a discharge opening of generally rectangular shape in transverse section and through which said flow of motive gasses is discharged to ambient;
means for selectively effecting pivotal movement of said flap carrier member, and dependent means for effecting both translational movement of said flap member between said pair of side walls and pivotal movement relative said flap carrier member in dependence upon pivotal movement of the latter so as to vary both the area of said discharge opening and the configuration of said flow path within said channel member;
a transversely extending cowl member including a pair of spaced apart axially extending flange portions, and a transversely extending axially arcuate wall portion extending between but short of said flange portions to define therewith a pair of axially extending grooves, one of said pair of grooves being immediately adjacent each one of said pair of flange portions, said cowl member also defining a transversely extending recess immediately adjacent said arcuate wall portion and spaced away from said flow path relative thereto:
said flange portions straddling said pair of walls and pivotally connecting thereto to define a transverse pivot axis and to receive said pair of ear portions individually into respective ones of said pair of grooves with said transverse wall portion movably disposed between said pair of ear portions:
a transversely extending sub-cowl member including a transversely extending axially arcuate wall part like said wall portion of said cowl member, said sub-cowl member being pivotally received in said recess of said cowl member and cooperating therewith to define a transverse pivot axis disposed proximate to adjacent transverse edges of said wall portion and wall part, in a first position of said sub-cowl member pivoted inwardly of said recess said wall part angularly cooperating with said cowl member wall portion to define a transverse cusp between said axially arcuate surfaces, in a second position of said sub-cowl member pivoted outwardly of said recess, said wall part and said wall portion being so disposed as to define adjacent segments of a common axially arcuate surface:
means for selectively pivoting said cowl member between a stowed position wherein said wall portion is disposed upwardly of and out of said fluid flow as the latter issues from said discharge opening, and a range of progressive thrust vectoring positions wherein said cowl member moves progressively into said fluid flow to deflect the latter downwardly with said wall portion;

means for maintaining said sub-cowl member in said second position thereof substantially throughout movement of said cowl member between said stowed position and said thrust vectoring positions, sealing means carried by said upper wall for sealingly and movably cooperating with said sub-cowl member in said second position thereof, said sub-cowl member also progressively moving into said fluid flow issuing from said discharge opening to cooperate with said wall portion by deflecting said fluid flow downwardly with said wall part;

means for moving said sub-cowl member to said first position thereof in response to movement of said cowl member to a thrust reversing position farther into said fluid flow than any of said thrust vectoring positions, said sub-cowl member breaking engagement with said sealing member and opening an upwardly disposed aperture between said upper wall and said sub-cowl member by movement of the latter to said first position thereof, said transverse cusp horizontally splitting said fluid flow substantially equally into vertically separate portions, said wall part directing an upper of said fluid flow portions upwardly and forwardly through said aperture, said wall portion directing a lower of said fluid flow portions downwardly and forwardly, thereby to achieve thrust reversing substantially without thrust vectoring.

20. The invention of claim 19 wherein said dependent means for moving said flap member includes an arm part fixedly connecting with said channel member and defining a first pivot axis disposed downwardly and rearwardly of said pivotal connection of said flap carrier member with the remainder of said nozzle apparatus, a bracket member dependent from said flap member and defining a second pivot axis axially intermediate said upstream edge and said downstream marginal edge thereof, and an elongate drag link member extending between said arm part and said bracket member and pivotally connecting to each at said respective first and second axis.

21. The invention of claim 19 wherein said means for maintaining said sub-cowl member in said second position thereof includes said pair of ear portions each defining respective ones of a pair of cam tracks, said sub-cowl member carrying a pair of cam follower members received in respective ones of said pair of cam tracks and spaced from the pivotal connection of said sub-cowl member with said cowl member, said cam follower members moving along said cam tracks in response to pivotal movement of said cowl member, and said pair of cam tracks including a true radius section with respect to said transverse pivot axis of said cowl member, said pair of cam follower members upon said true radius section disposing said sub-cowl member in said second position thereof.

22. The invention of claim 21 wherein said means for moving said sub-cowl member to said first position thereof includes said pair of cam tracks defining also a terminal end section deviating quickly outwardly with respect to said true radius section, and said pair of cam follower members moving onto said end section in response to movement of said cowl member to said thrust reversing position thereof.

23. The invention of claim 22 further including said cowl member and said sub-cowl member defining cooperating abutment means for engaging in response to said sub-cowl member moving to said first position with said cowl member in said thrust reversing position to isolate said pair of cam tracks and pair of cam follower members from thrust reversing forces.

* * * * *